US008250338B2

(12) United States Patent
Burns et al.

(10) Patent No.: US 8,250,338 B2
(45) Date of Patent: *Aug. 21, 2012

(54) BROADCASTING INSTRUCTIONS/DATA TO A PLURALITY OF PROCESSORS IN A MULTIPROCESSOR DEVICE VIA ALIASING

(75) Inventors: Adam P. Burns, Austin, TX (US); Steven L. Roberts, Cedar Park, TX (US); Christopher J Spandikow, Austin, TX (US); Todd E. Swanson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 910 days.

This patent is subject to a terminal disclaimer.

(21) Appl. No.: 12/129,042

(22) Filed: May 29, 2008

(65) Prior Publication Data
US 2008/0229051 A1    Sep. 18, 2008

Related U.S. Application Data

(63) Continuation of application No. 11/421,512, filed on Jun. 1, 2006, now Pat. No. 7,493,468.

(51) Int. Cl.
*G06F 15/80* (2006.01)
(52) U.S. Cl. ............... 712/14; 712/13; 712/15
(58) Field of Classification Search ............ 712/13, 712/14, 15, 225
See application file for complete search history.

(56) References Cited

U.S. PATENT DOCUMENTS 4,729,095 A * 3/1988 Colley et al. ............. 712/203
5,418,913 A * 5/1995 Fujimoto .................. 709/213
5,561,784 A * 10/1996 Chen et al. ................ 711/157
5,898,883 A    4/1999 Fujii et al.
5,924,112 A    7/1999 Barber et al.
6,088,770 A * 7/2000 Tarui et al. ................ 711/148
6,321,323 B1 * 11/2001 Nugroho et al. ............ 712/34
6,539,020 B1   3/2003 Barber et al.
6,546,471 B1 * 4/2003 Tarui et al. ................ 711/148
6,578,112 B2 * 6/2003 Ono .......................... 711/137
6,646,646 B2  11/2003 Peterson et al.
6,748,479 B2   6/2004 Sano et al.

(Continued)

OTHER PUBLICATIONS

Abrossimov, Vadim et al., "Generic Virtual Memory Management for Operating System Kernels", Association for Computing Machinery, ACM 1989, pp. 123-136.

(Continued)

*Primary Examiner* — Aimee Li
(74) *Attorney, Agent, or Firm* — Stephen J. Walder, Jr.; Matthew B. Talpis

(57) ABSTRACT

A mechanism for broadcasting instructions/data to a plurality of processors in a multiprocessor device via aliasing is provided. In order to broadcast data to a plurality of processors, a control processor writes to the registers that store the identifiers of the processors and sets two or more of these registers to a same value. The control processor may write the desired data/instructions to be broadcast to a portion of memory corresponding to the starting address associated with the processor identifier of the two or more processors. When the two or more processors look for a starting address of their local store from which to read, the two or more processors will identify the same starting address, essentially aliasing the memory region. The two or more processors will read the instructions/data from the same aliased memory region starting at the identified starting address and process the same instructions/data.

20 Claims, 7 Drawing Sheets

U.S. PATENT DOCUMENTS

| | | | |
|---|---|---|---|
| 6,999,979 | B2 | 2/2006 | Garthwaite |
| 7,321,909 | B1 | 1/2008 | Garthwaite |
| 7,363,434 | B2* | 4/2008 | Polyudov ............... 711/147 |
| 7,383,412 | B1 | 6/2008 | Diard |
| 2001/0037435 | A1* | 11/2001 | Van Doren ............... 711/153 |
| 2004/0186988 | A1* | 9/2004 | Polyudov ............... 713/100 |
| 2007/0011684 | A1 | 1/2007 | Du et al. |
| 2007/0130372 | A1 | 6/2007 | Irish et al. |
| 2008/0155510 | A1 | 6/2008 | Zheltov et al. |
| 2008/0229051 | A1 | 9/2008 | Burns et al. |

OTHER PUBLICATIONS

Nguyen, Nghi et al., "Memory Allocation for Embedded Systems with a Compile-Time-Unknown Scratch-Pad Size", ACM 2005, pp. 115-125.

* cited by examiner

ACCESS TYPE         READ/WRITE
BASE ADDRESS OFFSET (BP_Base | P1(n)) + x'0010', WHERE n IS THE SPE NUMBER

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| RESERVED ||||||||||||||||||||||||||||||||

| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|----|----|----|----|----|----|----|----|----|----|----|----|----|----|----|----|----|----|----|----|----|----|----|----|----|----|----|----|----|----|----|----|
| PROCESSOR ID VALUE ||||||||||||||||||||||||||||||||

| BITS | FIELD NAME | DESCRIPTION |
|------|------------|-------------|
| 0:31 | RESERVED | SET TO ZEROS |
| 32:63 | PROCESSOR ID VALUE | USED TO DISTINGUISH THE SPUs IN THE SYSTEM |

*FIG. 3*

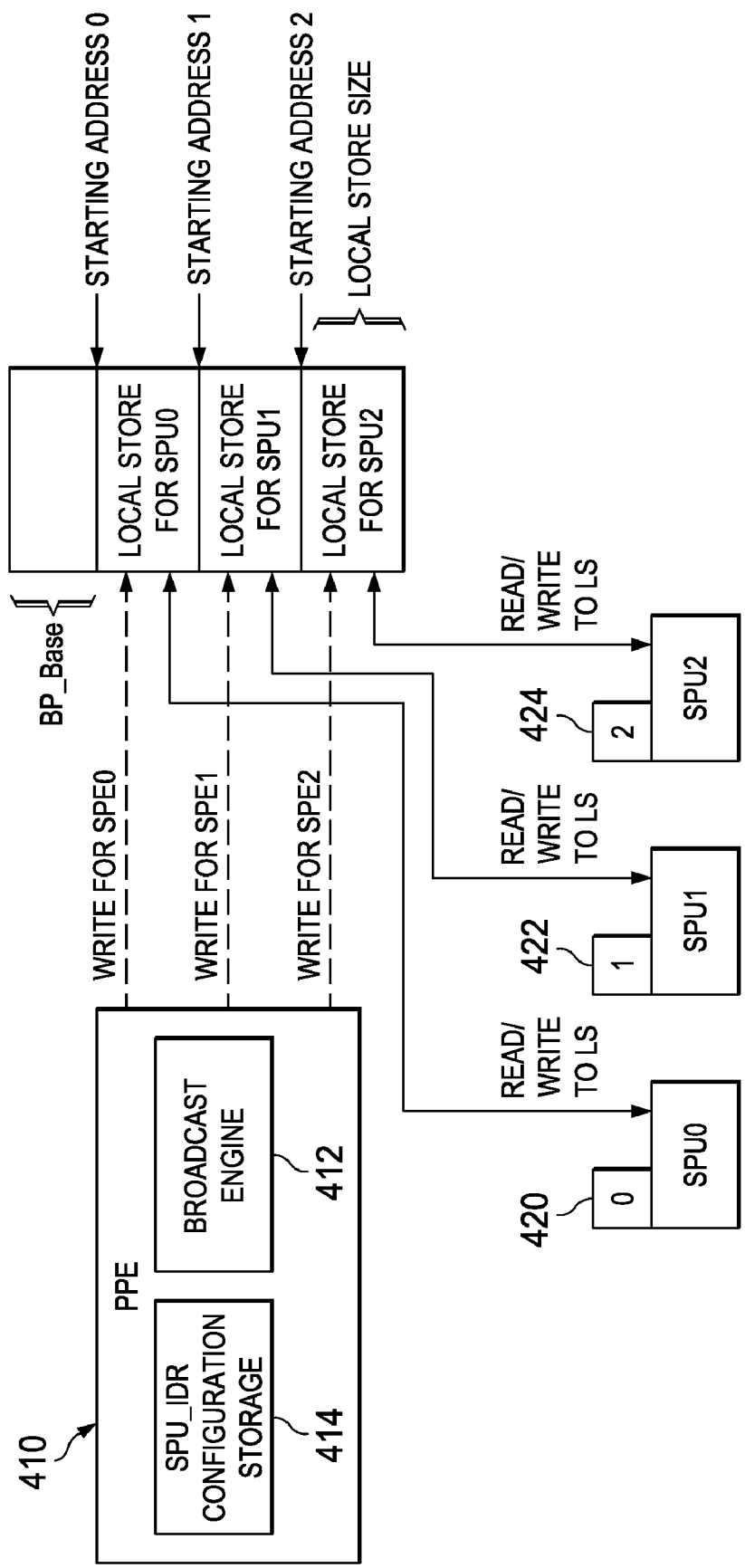

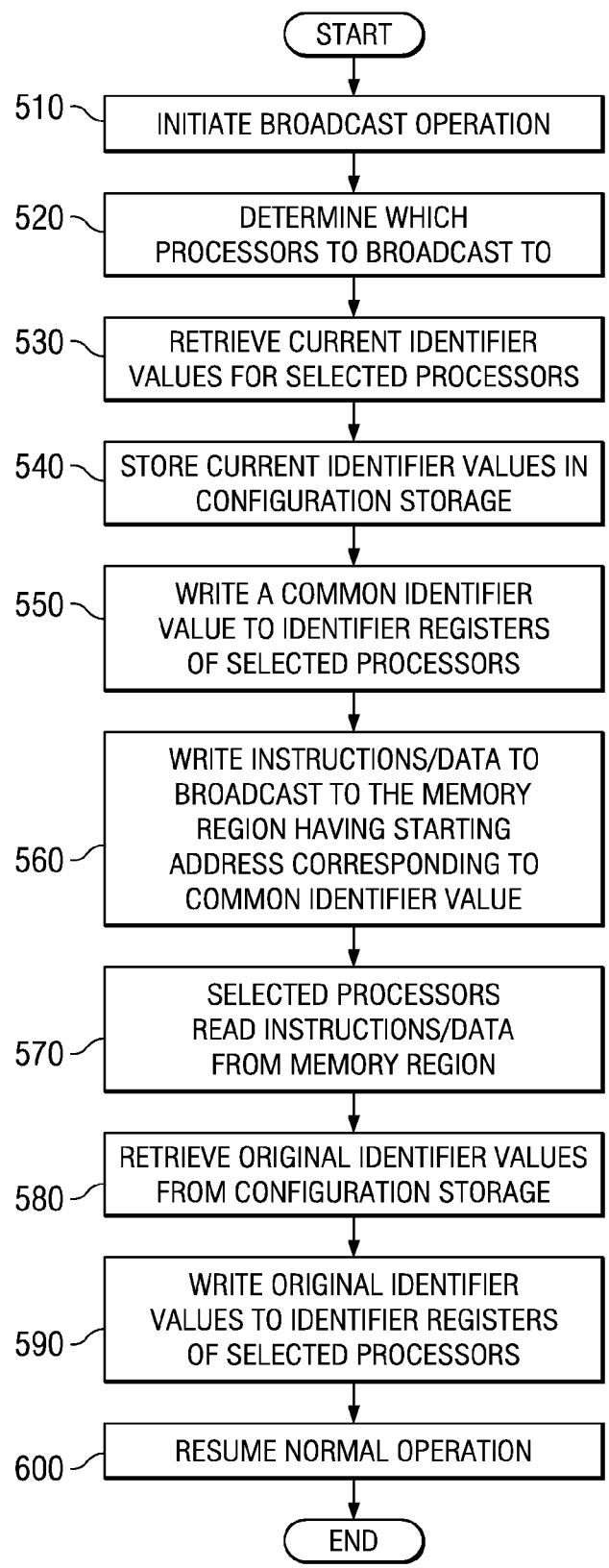

BROADCASTING INSTRUCTIONS/DATA TO A PLURALITY OF PROCESSORS IN A MULTIPROCESSOR DEVICE VIA ALIASING

This application is a continuation of application Ser. No. 11/421,512, filed Jun. 1, 2006, now U.S. Pat. No. 7,493,468.

BACKGROUND

1. Technical Field

The present application relates generally to an improved data processing system and method. More specifically, the present application is directed to a system and method for broadcasting instructions/data to a plurality of processors in a multiprocessor device via aliasing.

2. Description of Related Art

The recent trend in computing devices is to provide multiple processors in a single computing device that may each execute different instructions at substantially the same time. By providing multiple processors in this way, greater speed of execution of instructions is achieved by distributing an application across multiple processors.

One type of multiprocessor system is the symmetric multiprocessor (SMP) system in which two or more identical processors are connected to a single shared main memory. Most common multiprocessor systems today use an SMP architecture. SMP systems allow any processor to work on any task no matter where the data for that task is located in memory. With proper operating system support, SMP systems can easily move tasks between processors to balance the work load efficiently. On the downside, memory is much slower than the processors accessing them, and even single-processor machines tend to spend a considerable amount of time waiting for data to arrive from memory. SMP makes this worse, as multiple processors are competing for one set of resources.

Different types of memory organization are used in SMP systems. One such type is Non-Uniform Memory Access (NUMA) systems which dedicate different memory banks to different processors. This allows processors to access memory in parallel, which can dramatically improve memory throughput if the data is localized to specific processes and thus, specific processors. On the downside, NUMA makes the cost of moving data from one processor to another more expensive, meaning that balancing a workload is more expensive. The benefits of NUMA are limited to particular workloads, notably on servers where the data is often associated strongly with certain tasks or users.

Other systems include asymmetric or asymmetrical multi-processing (ASMP) systems in which separate specialized processors are used for specific tasks. Moreover, computer clustered multiprocessing (e.g., Beowulf), in which not all memory is available to all processors, is another type of asymmetric multiprocessing system. The former is not widely used or supported, although the high-powered 3D chipsets in modern videocards could be considered a form of asymmetric multiprocessing. The latter is used fairly extensively to build very large supercomputers.

In these types of multiprocessor systems, the concern is the ability to distribute the processing load across a plurality of processors by having each processor process different instructions and different data. Thus, these systems are not configured to allow for the broadcasting of a singular dataset to a plurality of processors in the multiprocessor system. In fact, the bus architecture in such systems typically prevents broadcasting of instructions and/or data to a plurality of processors since it is necessary to be able to distinguish between processors in order to perform load distribution and load balancing operations.

SUMMARY

The illustrative embodiments provide a system and method for broadcasting instructions/data to a plurality of processors in a multiprocessor device via aliasing. In one illustrative embodiment, a memory mapped input/output (MMIO) register is provided for each of the processors in a multiprocessor system that stores an identifier of the particular processor within the multiprocessor system. Another MMIO register is provided that identifies the size of the local stores associated with the plurality of processor. These MMIO registers are used by the processors to define a starting address for the local store associated with particular processors.

In order to broadcast data to a plurality of processors within the multiprocessor system, a processor controlling the broadcast, e.g., a control processor, writes to the MMIO registers that store the identifiers of the various processors and sets two or more of these MMIO registers to a same value, thereby temporarily identifying the local storage area of two or more processors to be the same. The control processor may write the desired data and/or instructions to be broadcast, such as via a direct memory access (DMA) write operation, to a portion of memory corresponding to the starting address associated with the local storage starting address identifier of the two or more processors.

In this way, when the two or more processors look for a starting address of their local store from which to read instructions/data to process, the two or more processors will identify the same starting address, essentially aliasing a memory region between the two or more processors. The two or more processors will read the instructions/data from the same aliased memory address space starting at the identified starting address and process the same instructions/data.

Thereafter, once the broadcast operation has been completed, the control processor may then reset the MMIO registers storing the identifiers of the two or more processors back to their original values. Normal operation of the multiprocessor system may then be resumed.

In one illustrative embodiment, a method, in a multiprocessor system, for broadcasting data to a plurality of processors is provided. The method may comprise modifying, for each processor of the plurality of processors, a starting address for a memory region assigned to the processor to be a common starting address for each of the plurality of processors. Data to be broadcast to the plurality of processors may be written to a memory region corresponding to the common starting address. After writing the data to be broadcast to the memory region corresponding to the common starting address, the starting address for the memory region assigned to each processor may be modified to be an original starting address that is not common among the plurality of processors. The plurality of processors may be a subset of all of the processors in the multiprocessor system.

Modifying the starting address for a memory region may comprise writing to an identifier register associated with a processor, a common identifier value. The common identifier value may be the same for each of the processors in the plurality of processors. The starting address may be determined by the following relationship:

starting address=identifier*size+base_offset where the identifier is an identifier value for a processor provided in an identifier register associated with the processor, size is a size of a memory region associated with the processor, and base_offset is an offset address value for a first memory region.

Modifying, for each processor of the plurality of processors, the starting address for the memory region assigned to the processor to be an original starting address that is not common among the plurality of processors may comprise providing the identifier register associated with the processor as independent of the memory region associated with the processor. An original identifier value may be written to the identifier register to thereby modify the starting address for the memory region assigned to the processor to be the original starting address.

Modifying, for each processor of the plurality of processors, the starting address for the memory region assigned to the processor to be an original starting address that is not common among the plurality of processors may comprise placing all of the processors in the plurality of processors into a State Retained and Isolated (SRI) mode of operation except for one processor. An original identifier value may be written to the memory region associated with the processors. The one processor may read the original identifier value and set its identifier value in the identifier register to the original identifier value. The placing, writing and reading steps may be repeated iteratively such that each processor in the plurality of processors has its identifier value returned to an original identifier value.

The multiprocessor system may be a multiprocessor system having a control processor and a plurality of co-processors. The plurality of co-processors may constitute the plurality of processors. The multiprocessor system may be a heterogeneous multiprocessor system in which the plurality of co-processors operate using a different instruction set from the control processor.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In still other illustrative embodiments, a multiprocessor computing system is provided that includes a control processor and a plurality of co-processors coupled to the control processor. The control processor may perform various ones, and combinations of, the operations outlined in the method illustrative embodiment described above.

In yet another illustrative embodiment, a method, in a multiprocessor system, is provided for broadcasting data to a plurality of processors having a shared memory. The method may comprise modifying, for each processor of the plurality of processors, a starting address for a memory region, in the shared memory, assigned to the processor, such that each of the plurality of processors has a common starting address in the shared memory. Data may be written to the memory region identified by the common starting address, thereby broadcasting the data to the plurality of processors. In response to writing data to the memory region identified by the common starting address, the starting address for the memory region assigned to each processor may be modified such that each processor has a unique starting address in the shared memory.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating an synergistic processing unit identification register in accordance with one illustrative embodiment;

FIGS. 4A-4C are exemplary diagrams illustrating a mechanism for broadcasting data to a plurality of processors in a multiprocessor system in accordance with one illustrative embodiment; and FIG. 5 is a flowchart outlining an exemplary operation for broadcasting data to a plurality of processors in a multiprocessor system.

DETAILED DESCRIPTION OF THE PREFERRED EMBODIMENTS

The illustrative embodiments provide a system and method for broadcasting instructions/data to processors in a multiprocessor system. The illustrative embodiments may be used with any multiprocessor system in which a modifiable mechanism is provided for uniquely identifying each of the processors of the multiprocessor system. One such multiprocessor system in which the illustrative embodiments may be implemented is the Cell Broadband Engine (CBE) architecture available from International Business Machines, Inc. of Armonk, N.Y. The CBE architecture will be used as an example multiprocessor processing system in which the illustrative embodiments are implemented for purposes of this description. However, it should be appreciated that the illustrative embodiments are not limited to use with the CBE architecture and may be used with other multiprocessor systems without departing from the spirit and scope of the present invention.

Figure 1:
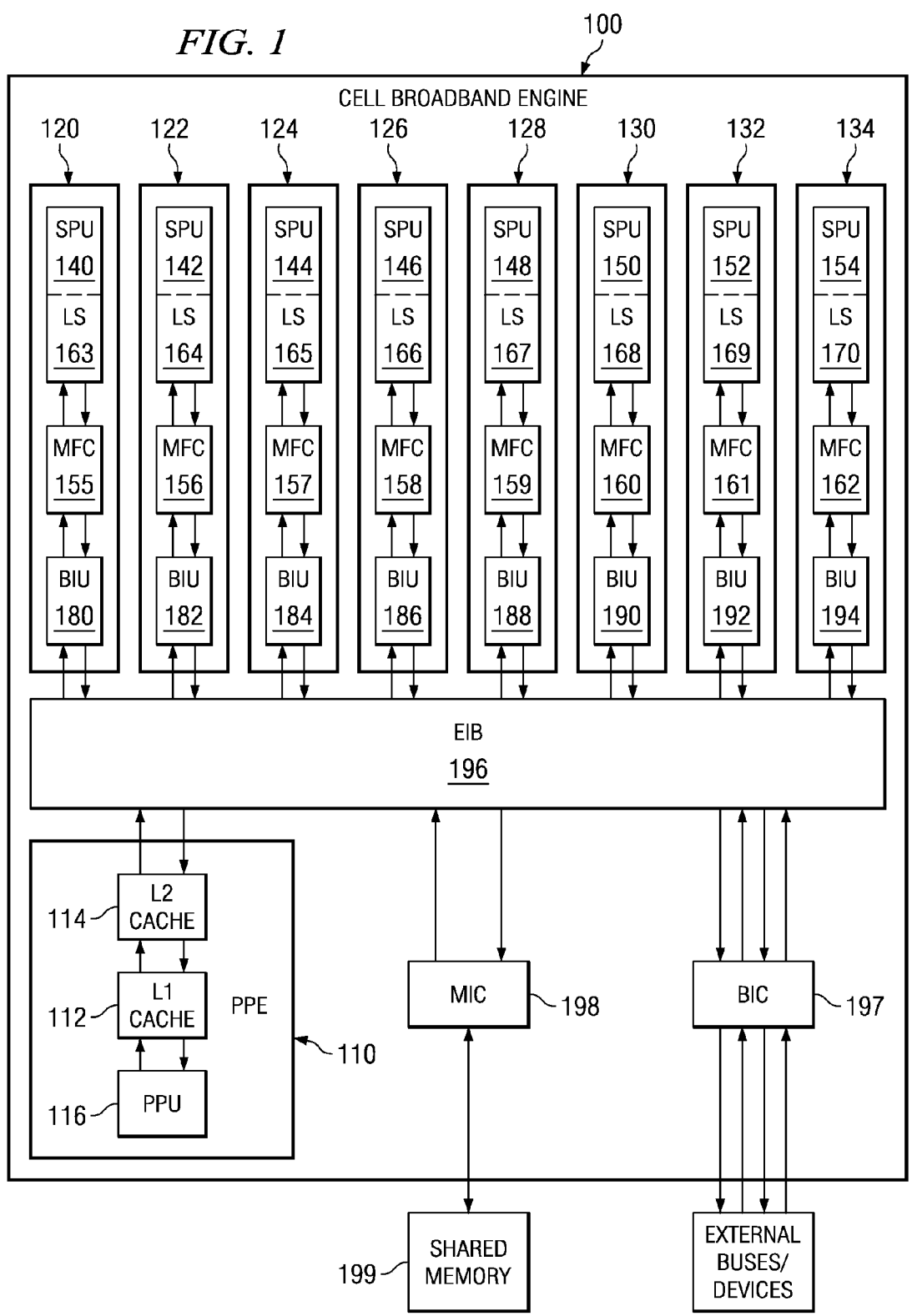
FIG. 1 is an exemplary block diagram illustrating a Cell Broadband Engine (CBE) architecture in which an illustrative embodiment may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs may be different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Figure 2:
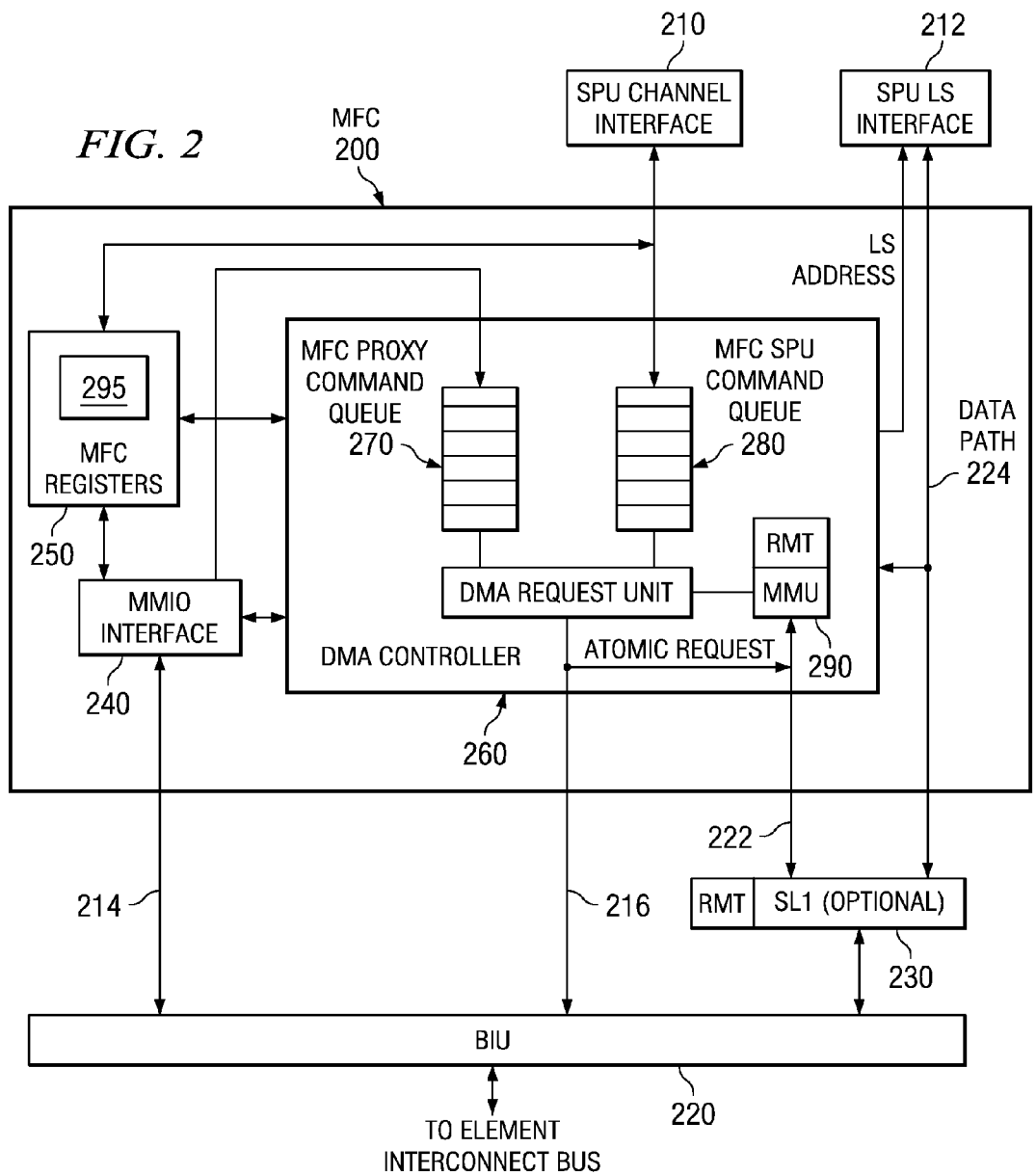
FIG. 2 is an exemplary block diagram of a memory flow controller of a synergistic processor element in accordance with one illustrative embodiment.

FIG. 2 is an exemplary block diagram of a typical memory flow control (MFC) unit 200 in accordance with an exemplary embodiment of the present invention. In this exemplary embodiment, the MFC 200 has two interfaces 210 and 212 to the SPU, two interfaces 214 and 216 to the Bus Interface Unit (BIU) 220, and two interfaces 222 and 224 to an optional SL1 cache 230. The SPU interfaces 210 and 212 are the SPU channel interface 210 and the SPU local storage interface 212. The SPU channel interface 210 allows the SPU to access MFC facilities and to issue MFC commands. The SPU local storage interface 212 is used by the MFC 200 to access the local storage in the SPU. One interface 216 to the BIU 220 allows Memory Mapped I/O (MMIO) access to the MFC facilities. This interface 216 also allows other processors to issue MFC commands. Commands issued using MMIO are referred to as MFC proxy commands.

The interfaces 222 and 224 to the SL1 cache are mainly for data transfers. One interface 222 is used by the MFC 200 for access to the address translation tables in main storage and the other 224 is used for the transfer of data between main storage and local storage.

As shown in FIG. 2, the main units in a typical MFC include a memory mapped input/output (MMIO) interface 240, MFC registers 250, and DMA controller 260. The MMIO interface 230 maps the MFC facilities of the SPU into the real address space of the system. This allows access to the MFC facilities from any processor, or any device in the system. In addition, the MMIO interface 240 may be configured to map the local storage of the SPU into the real address space. This allows direct access to the local storage from any processor or any device in the system, enabling local-store-to-local-store transfers and the ability for I/O devices to directly access the local storage domain of an SPU.

The MFC registers unit 250 contains most of the MFC facilities. Of particular importance to the present invention, the MFC registers unit 250 includes an SPU local storage limit register facility. With this facility, privileged software may set a limit on the size of the local storage of the SPE, as will be described in greater detail hereafter.

The synchronization and the transfer of data is generally the responsibility of the DMAC 260 within the MFC 200. The DMAC 260 can move data between the local storage of an SPU and the main storage area. Optionally, the data can be cached in the SL1 cache.

The SPE and PPE instruct the MFC 200 to perform these DMA operations by queuing DMA command requests to the MFC through one of the command queues 270 and 280. Commands issued by an SPE are queued to the MFC SPU command queue 270. Commands issued by a PPE are queued to the MFC proxy command queue 280. The MFC uses a memory mapping unit (MMU) 290 to perform all MFC address translations and MFC access protection checks required for the DMA transfers.

MFC commands provide the main method that enables code executing in a SPU to access main storage and maintain synchronization with other processors and devices in the system. Commands are also provided to manage optional caches. MFC commands can either be issued by code running on the SPU, or by code running on another processor or device, such as the PPE. Code running on the associated SPU executes a series of channel instructions to issue an MFC command. Code running on other processors or devices performs a series of memory mapped I/O (MMIO) transfers to issue an MFC command to an SPE. The commands issued are queued to one of the command queues 270 and 280.

In general, commands can be queued using MMIO registers of the MFC registers unit 250, or through channel instructions executed by the associated SPU. The MMIO method is intended for use by the PPE to control the transfer of data between main storage and the associated local storage on behalf of the SPE. MFC commands that transfer data are referred to as MFC DMA commands. The data transfer direction for MFC DMA commands is always referenced from the perspective of an SPE. Therefore, commands that transfer data into an SPE (from main storage to local storage) are considered get commands, while commands that transfer data out of an SPE (from local storage to main storage) are considered put commands.

Commands that transfer data are referred to as MFC DMA commands. These commands are converted into DMA transfers between the local storage domain and main storage domain. Each MFC can typically support multiple DMA transfers at the same time and can maintain and process multiple MFC commands. Each MFC DMA data transfer command request involves both a local storage address (LSA) and an effective address (EA). The local storage address can directly address only the local storage area of its associated SPU. The effective address has a more general application in that it can reference main storage, including all the SPU local storage areas, if they are aliased into the real address space.

In the above CBE architecture 100, each of the SPUs 140-154 are individually identifiable via a SPU identification register (SPU_IDR) provided in a memory mapped input/output (MMIO) register associated with the particular SPU. For example, the SPU_IDR may be provided as part of a set of SPU privileged facilities in the MFC's registers 250, e.g., SPU_IDR 295 in FIG. 2.

The SPU_IDR 295 contains a 32-bit value that can be used to distinguish the SPU from other SPUs in the CBE architecture 100. The contents of the SPU_IDR 295 are accessible to the PPE 110 such that the PPE 110 may read and write to this register 295 in a privileged manner while the SPUs are not able to read or write to the SPU_IDR 295.

FIG. 3 is an exemplary diagram illustrating the contents of the SPU_IDR in accordance with one illustrative embodiment. As shown in FIG. 3, the first 32 bits, i.e. bits 0-31, of the SPU_IDR are reserved and are set to zeros. The last 32 bits, i.e. bits 32-63, are used to store a 32 bit value that distinguishes the SPU from other SPUs in the system. Access type to the SPU_IDR is read/write for the PPE 110, but access to this register from the SPUs is not provided.

In the CBE architecture, the SPU_IDR value is used as a means for identifying a starting address for the local store associated with that SPU. That is, the local stores 163-170 may be provided as separate memory regions of a single memory array that are apportioned to each of the SPUs 140-154. The SPU_IDR value may be used to perform this apportionment by setting a starting address for the SPU's apportioned memory region.

The starting address for the local store associated with the SPU is further based on the local store size to be apportioned to each of the SPUs 140-154. A local store size register, which also may be provided as part of the MFC registers 250 for example, may store a local store size value for the SPUs 140-154. Based on this local store size and the SPU_IDR value, a starting address is calculated for the local store for a particular SPU. For example, in one illustrative embodiment, the starting address for the local store of a SPU is calculated using the following equation:

$$SPE\_LS\_start\_address = SPU\_NUM * LS\_SIZE + BP\_BASE$$

where SPU_NUM is the number of the SPU stored in the SPU_IDR value, LS_SIZE is the local store size value stored in the local store size register, and BP_BASE is the base register address for local store registers. Thus, if two or more SPUs SPU_IDR values are set to the same value, and the local store size for the two or more SPUs are the same, then the starting address for local store associated with these two or more SPUs will be the same. As a result, the two or more SPUs will be able to read from the same memory region, i.e. an aliased memory region, starting at the designated starting address determined based on the SPU number, local store size, and base register address.

In this way, by writing instructions/data to this aliased memory region, the instructions/data may be read by a plurality of SPUs, thereby broadcasting the instructions/data to the SPUs. This is especially useful in the CBE architecture since the bus architecture does not itself support broadcasting of instructions/data to the SPUs. Rather, the bus architecture is constructed so that each of the SPUs are individually identifiable and may be provided with different sets of instructions/data. However, as illustrated above, while the bus architecture does not permit broadcasting of instructions/data, the CBE architecture itself supports broadcasting through manipulation of the SPU_IDRs in the manner set forth by the illustrative embodiments.

The illustrative embodiments provide a system and method for broadcasting instructions/data to a plurality of processors, e.g., SPUs 140-154, in a multiprocessor device, such as a CBE architecture system-on-a-chip as depicted in FIG. 1. The illustrative embodiments make use of the SPU_IDR as a means for aliasing a memory region so that a plurality of SPUs read instructions/data from this same aliased memory region. The PPE 110 is provided with a broadcast engine and SPU_IDR configuration storage. The broadcast engine is responsible for writing to selected SPU_IDRs for SPUs to which instructions/data are to be broadcast to thereby set the values of these SPU_IDRs to a same value. The broadcast engine writes the original values for these SPU_IDRs to the SPU_IDR configuration storage so that they may be later restored after broadcasting of the instructions/data.

The broadcast engine is further responsible for writing the instructions/data to an aliased memory region that is accessible by the selected SPUs. Once the broadcast of the instructions/data is complete, the broadcast engine restores the SPU_IDR values stored in the SPU_IDR configuration storage to the various SPU_IDRs so that normal operation of the CBE system-on-a-chip may be resumed.

Thus, the broadcast engine temporarily sets a plurality of SPUs to a same SPU identifier and writes instructions/data to an aliased memory region that is accessible by SPUs having the same SPU identifier. The broadcast engine then sets the SPUs to their original SPU identifiers and resumes normal operation of the multiprocessor device.

Figure 4B:
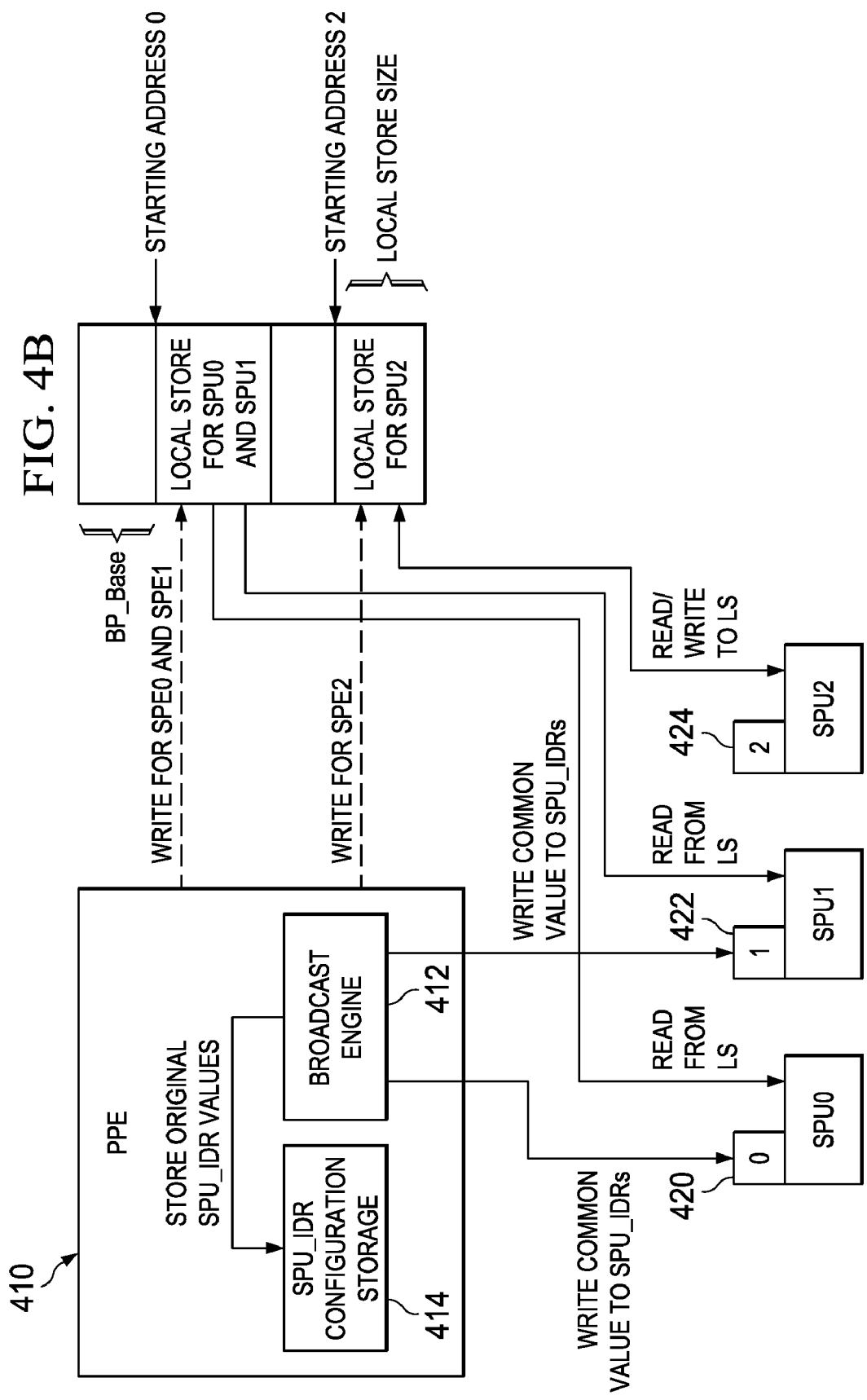
Figure 4C:
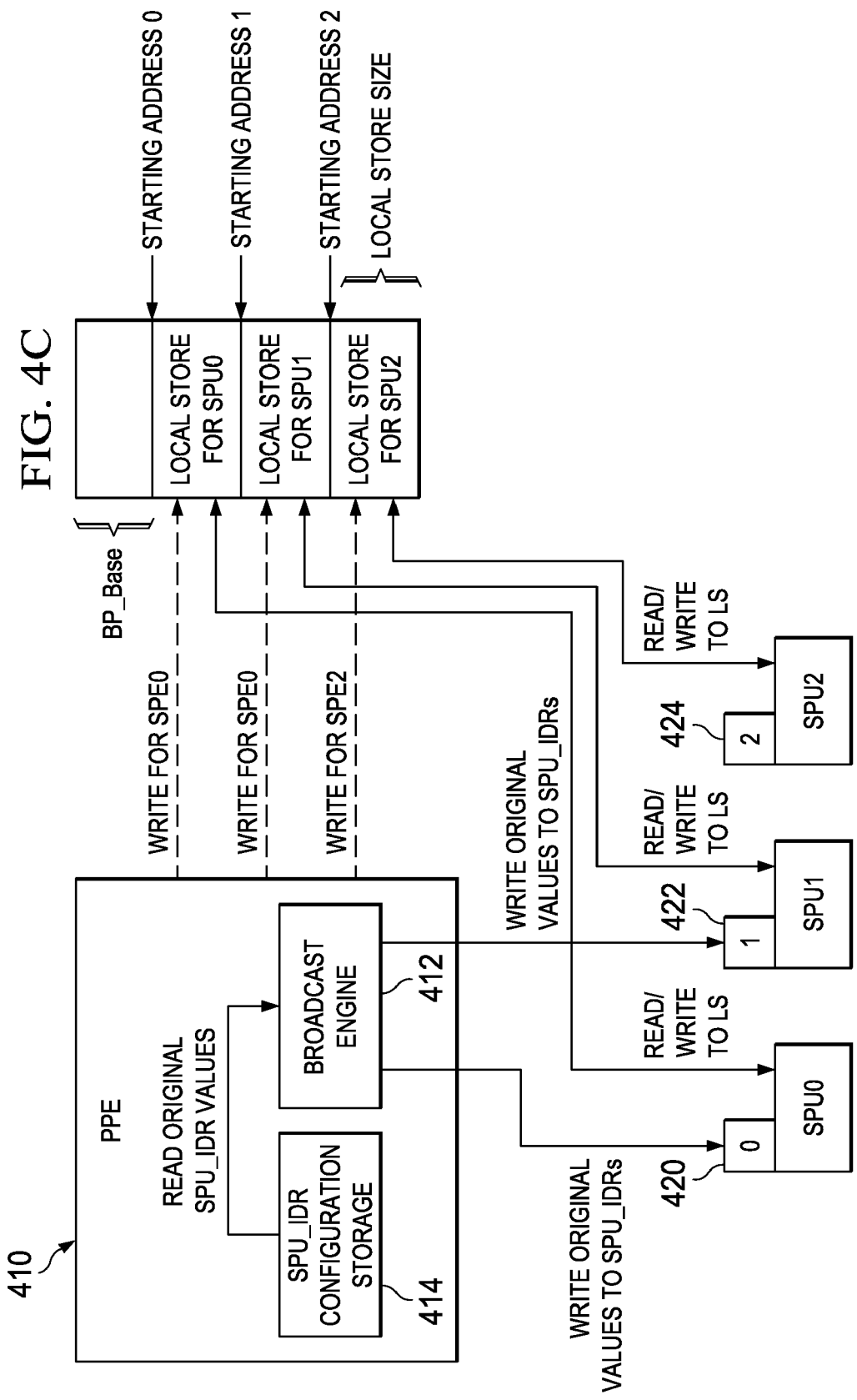

FIGS. 4A-4C are exemplary diagrams illustrating a mechanism for broadcasting data to a plurality of processors in a multiprocessor system in accordance with one illustrative embodiment. The illustrative embodiments shown in FIGS. 4A-4C make use of three SPUs and their corresponding local store memory regions for simplicity. It should be appreciated that any number of SPUs may be used with the illustrative embodiments without departing from the spirit and scope of the present invention. For example, as shown in FIG. 1 above, seven SPUs may be provided and thus, seven local store memory regions may be utilized in one illustrative embodiment.

As shown in FIG. 4A, during normal operation, the PPE 410 writes instructions and data to various memory regions, i.e. local stores, for the various SPUs. Thus, instructions and/or data that are to be processed by SPU0 are written to the local store memory region for SPU0, instructions and/or data that are to be processed by SPU1 are written to the local store memory region for SPU1, and so on.

Each SPU0-SPU2 has an associated SPU_IDR 420-424 designating the identification of the SPU, e.g., 0, 1 and 2. The local store memory region for each SPU is defined by a starting address and local store size. The starting address is determined based on the SPU identifier, e.g., 0, 1, or 2, the local store size, and the base register address BP base. Thus, the local store for SPU0 has a starting address at BP_base (i.e., 0*LS_size+BP_base), the local store for SPU1 has a starting address at LS_size+BP_base (i.e., 1*LS_size+BP_base), and the starting address for the local store for SPU2 is at 2LS_size+BP base. Each SPU may read and write instructions/data from and to the local store memory region corresponding to their respective start address and local store size.

As shown in FIG. 4B, when a broadcast of instructions/data is to be performed, the broadcast engine 412 of the PPE 410 may select the SPUs to which the instructions/data are to be broadcast, which may be all of the SPUs or a select subset of the SPUs, and may store their original SPU_IDR values in an SPU_IDR configuration storage 414. The broadcast engine 412 may then write a common SPU identifier to the SPU_IDRs of the selected SPUs. For example, the broadcast engine 412 may write a SPU0 identifier to the SPU_IDRs 420 and 422 for SPUs 0 and 1 to thereby cause both SPUs to operate as if they were the same SPU, i.e. SPU0.

As a result, when the SPUs 0 and 1 attempt to read from their local store memory region, both SPUs read from the same local store memory region starting at the start address corresponding to SPU0, i.e. the local store memory region staring at a starting address of BP_base (i.e. 0*LS_size+BP_base). In this way, the same local store memory region is aliased between two or more SPUs.

Once the selected SPUs are reconfigured to have the same value stored in the SPU_IDRS, the broadcast engine 414 may write instructions/data to be broadcast to the selected SPUs into the local store memory region corresponding to the common SPU_IDR value. When the selected SPUs, e.g., SPU0 and SPU1, read from their local store memory region, the will both read from this aliased local store memory region to which the broadcast instructions/data have been written and thus, both SPUs will receive the same instructions/data to be processed. Hence, the instructions/data have been broadcast to a plurality of SPUs even though the bus architecture does not, in itself, support broadcasts of instructions/data.

After the broadcast instructions/data have been read by the selected SPUs, which may be determined by use of synchronization instructions provided in the CBE architecture, the SPU_IDR value must be returned to their original values in order to resume normal operation of the system. As shown in FIG. 4C, in order to resume normal operation, the broadcast engine 412 of the PPE 410 reads in the original SPU_IDR values from the SPU_IDR configuration storage 414 and writes these original values back to their respective SPU_IDRs 420 and 422. In this way, the starting addresses of the local store memory regions are returned to their normal values. Thereafter, instructions and data are written to local store memory regions in the same manner as described above with regard to FIG. 4A and the SPUs read and write to these local store memory regions in a normal fashion as described above with regard to FIG. 4A.

Thus, the illustrative embodiments provide a mechanism for aliasing a memory region so that it is accessed by a plurality of processors in a multiprocessor system. Instructions and data that are to be broadcast to the plurality of processors may be written to this aliased memory region so that the plurality of processors may read the instructions and data and process them. The aliasing of the memory region may be achieved by setting the starting address for the memory regions associated with the plurality of processors to be the same starting address. Setting the starting address to a same value for a plurality of processors may be achieved by setting the processors' identifiers to be a same value. In this way, the processors act as if they are the same processor for purpose of broadcasting instructions/data, even though they are actually separate processors in a multiprocessor system.

FIG. 5 is a flowchart outlining an exemplary operation for broadcasting data to a plurality of processors in a multiprocessor system. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 5, the operation starts with an initiation of a broadcast operation by a control processor, such as the PPE (step 510). The initiation of the broadcast operation may be performed, for example, in response to the operating system, an application, or the like, indicating that the same instructions/data should be provided to a plurality of processors within the multiprocessor system. A specific broadcast instruction may be provided for identifying the need to broadcast instructions/data to a plurality of processors within a multiprocessor system.

A broadcast engine associated with the control processor determines which processors within the multiprocessor system are to receive the broadcast instructions/data (step 520). In some illustrative embodiments, broadcasting of instructions/data is always performed to all of the processors, or co-processors, within the multiprocessor system. In other illustrative embodiments, broadcasting may be performed with regard to a select subset of processors within the multiprocessor system. In the latter case, this determination of which processors are to receive the broadcast instructions/data may be made, for example, by the control processor (PPE). Processors which are to receive the broadcast data may be mapped into a singular address space whereas processors meant to continue there normal operation may be left untouched.

The broadcast engine then retrieves the current identifier values for these processors stored in their respective memory mapped input/output identification registers (step 530). These original identifier values are stored, by the broadcast engine, in a configuration storage for later use in returning the system to a normal operational state (step 540). The broadcast engine may then write a common identifier to each of the identifier registers associated with the selected processors to which broadcast instructions/data are to be sent (step 550). As described previously, because the identifiers for processors are used to identify the starting address of the memory regions associated with the individual processors, by setting the identifiers to a common identifier, this process essentially points all of the processors to the same memory region thereby aliasing the memory region for use by all of the selected processors.

The broadcast engine may then write the instructions/data to be broadcast to the memory region designated by the starting address corresponding to the common identifier written to the identifier registers of the selected processors (step 560). The selected processors may then read the instructions/data from the aliased memory region (step 570). The broadcast engine may then retrieve the original identifier values from the configuration storage (step 580) and write these original values back to the appropriate identifier registers (step 590). Thereafter, normal operation of the system is resumed (step 600) and the process terminates.

It should be noted that, after setting the starting address for each of the processors to the common starting address using the common identifier, a problem may exist for returning the system to a normal operation since a plurality of processors are all associated with the same address region. Thus, if an original identifier is written to this address region in order to reset the identifier of a processor back to its original value, all of the processors keyed to that address region will be reset to this original value. Therefore, it is necessary to be able to isolate each processor when returning to normal operation.

One way in which such isolation may be performed is by providing a privileged address area, such as the MMIO registers that store the SPU_IDR, separate and independent from the local store that store the SPU_IDR values for the SPEs. This can be done by allowing implementations to have an offset register which allow the privileged area to be staggered for each processor rather than having these MMIO registers being part of the address area for the local store. In this way, while the redirection of the processors to the same local store starting address for broadcast purposes will affect the local store address area, the privileged address area is not affected by this redirection and can be independently written to by a privileged processor, e.g., the PPE, in order to change the identifier of the processors. The process may also be done by allowing for the privileged area to have a base register in a similar manner to the base register of the local store. Thus, by writing to the SPU_IDR that is provided independently of the local storage address area, the mechanisms of the illustrative embodiments may modify the starting addresses for each of the processors in order to perform broadcasts and return the system to a normal mode of operation.

In an alternative implementation, power management mechanisms may be used to implement the modification and return of the processor identifier values. For example, a processor may be placed in a State Retained and Isolated (SRI) mode of operation in which all access to the processor are inhibited. In this SRI mode of operation, the state remaining on the processor is retained. This SRI mode may be used to turn on tholds to an individual processor which essentially "shut off" the processor with regard to the rest of the system. With tholds on, the processor will not respond to the EIB.

Using such a power management mechanism, in order to undo the broadcast mode of operation, one would "turn off" all of the processors that require their identifier to be returned to an original value, using the SRI mode of operation, except for one of the processors. A write operation may be performed to the common address area corresponding to the common identifier. The one processor that remains active may read this original identifier value and have its associated identifier register set to the original identifier value to thereby change the identifier of the one processor that remains active back to its original value. This process is then repeated for each of the processors that require their identifier to be returned to the original value until all of these processors have their associated identifiers returned to their original values.

While the illustrative embodiments may make use of either one, or a combination of, these mechanisms, it should be appreciated that the illustrative embodiments are not limited to these mechanisms for modifying a processor identifier and returning a processor identifier to its original value. To the contrary, any suitable manner for implementing the modification and return of the values of the processor identifiers is intended to be within the spirit and scope of the present invention.

Thus, in view of the above, the illustrative embodiments provide a mechanism for broadcasting instructions/data to a plurality of processors in a multiprocessor system, such as the CBE system-on-a-chip. The illustrative embodiments provide a mechanism for aliasing a memory region for use by a plurality of processors such that the instructions/data stored in the aliased memory region may be read by each of the processors for processing. In this way, instructions and/or data may be broadcast to a selected set of processors without requiring the bus architecture to support broadcast transmissions of instructions/data.

The illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

As described previously above, a data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multiprocessor system, for broadcasting data to a plurality of hardware implemented processors, comprising:

modifying, by a broadcast engine of the multiprocessor system, for each processor of the plurality of processors, a starting address for a memory region assigned to the processor to be a common starting address for each of the plurality of processors;

writing, by the broadcast engine, data to be broadcast to the plurality of processors to a memory region corresponding to the common starting address; and modifying, by the broadcast engine, for each processor of the plurality of processors, the starting address for the memory region assigned to the processor to be an original starting address that is not common among the plurality of processors after writing the data to be broadcast to the memory region corresponding to the common starting address.

2. The method of claim 1, wherein the plurality of processors are a subset of all of the processors in the multiprocessor system.

3. The method of claim 1, wherein modifying the starting address for a memory region comprises:

writing to an identifier register associated with a processor, a common identifier value, wherein the common identifier value is the same for each of the processors in the plurality of processors.

4. The method of claim 3, wherein the starting address is determined by the following relationship:

starting address=identifier*size+base_offset where the identifier is an identifier value for a processor provided in an identifier register associated with the processor, size is a size of a memory region associated with the processor, and base_offset is an offset address value for a first memory region.

5. The method of claim 3, wherein modifying, for each processor of the plurality of processors, the starting address for the memory region assigned to the processor to be an original starting address that is not common among the plurality of processors comprises:

providing the identifier register associated with the processor as independent of the memory region associated with the processor; and writing an original identifier value to the identifier register to thereby modify the starting address for the memory region assigned to the processor to be the original starting address.

6. The method of claim 3, wherein modifying, for each processor of the plurality of processors, the starting address for the memory region assigned to the processor to be an original starting address that is not common among the plurality of processors comprises:

placing all of the processors in the plurality of processors into a State Retained and Isolated (SRI) mode of operation except for one processor;

writing an original identifier value to the memory region associated with the processors; and causing the one processor to read the original identifier value and set its identifier value in the identifier register to the original identifier value; and iteratively repeating the placing, writing, and causing steps such that each processor in the plurality of processors has its identifier value returned to an original identifier value.

7. The method of claim 1, wherein the multiprocessor system is a multiprocessor system having a control processor and a plurality of co-processors, and wherein the plurality of co-processors constitute the plurality of processors.

8. The method of claim 7, wherein the multiprocessor system is a heterogeneous multiprocessor system in which the plurality of co-processors operate using a different instruction set from the control processor.

9. A computer program product comprising a computer useable medium having a computer readable program, wherein the computer readable program, when executed on a multiprocessor computing device having a plurality of hardware implemented processors, causes a broadcast engine of the multiprocessor computing device to:

modify, for each processor of the plurality of processors, a starting address for a memory region assigned to the processor to be a common starting address for each of the plurality of processors;

write data to be broadcast to the plurality of processors to a memory region corresponding to the common starting address; and modify, for each processor of the plurality of processors, the starting address for the memory region assigned to the processor to be an original starting address that is not common among the plurality of processors, after the data to be broadcast is written to the memory region corresponding to the common starting address.

10. The computer program product of claim 9, wherein the plurality of processors are a subset of all of the processors in the multiprocessor computing device.

11. The computer program product of claim 9, wherein the computer readable program causes the multiprocessor computing device to modify the starting address for a memory region by:

writing to an identifier register associated with a processor, a common identifier value, wherein the common identifier value is the same for each of the processors in the plurality of processors.

12. The computer program product of claim 11, wherein the starting address is determined by the following relationship:

starting address=identifier*size+base_offset where the identifier is an identifier value for a processor provided in an identifier register associated with the processor, size is a size of a memory region associated with the processor, and base_offset is an offset address value for a first memory region.

13. The computer program product of claim 11, wherein the computer readable program causes the multiprocessor computing device to modify, for each processor of the plurality of processors, the starting address for the memory region assigned to the processor to be an original starting address that is not common among the plurality of processors by:
providing the identifier register associated with the processor as independent of the memory region associated with the processor; and
writing an original identifier value to the identifier register to thereby modify the starting address for the memory region assigned to the processor to be the original starting address.

14. The computer program product of claim 11, wherein the computer readable program causes the multiprocessor computing device to modify, for each processor of the plurality of processors, the starting address for the memory region assigned to the processor to be an original starting address that is not common among the plurality of processors by:
placing all of the processors in the plurality of processors into a State Retained and Isolated (SRI) mode of operation except for one processor;
writing an original identifier value to the memory region associated with the processors; and
causing the one processor to read the original identifier value and set its identifier value in the identifier register to the original identifier value; and
iteratively repeating the placing, writing, and causing steps such that each processor in the plurality of processors has its identifier value returned to an original identifier value.

15. A multiprocessor computing system, comprising:
a hardware implemented control processor; and
a plurality of hardware implemented co-processors coupled to the control processor, wherein a broadcast engine of the control processor:
modifies, for each co-processor of the plurality of co-processors, a starting address for a memory region assigned to the co-processor to be a common starting address for each of the plurality of co-processors;
writes data to he broadcast to the plurality of co-processors to a memory region corresponding to the common starting address; and
modifies, for each co-processor of the plurality of co-processors, the starting address for the memory region assigned to the co-processor to be an original starting address that is not common among the plurality of co-processors, after data to be broadcast is written to the memory region corresponding to the common starting address.

16. The system of claim 15, wherein the plurality of co-processors are a subset of all of the co-processors in the multiprocessor computing system.

17. The system of claim 15, wherein the control processor modifies the starting address for a memory region by:
writing to an identifier register associated with a co-processor in the plurality of co-processors, a common identifier value, wherein the common identifier value is the same for each of the co-processors in the plurality of co-processors.

18. The system of claim 17, wherein the starting address is determined by the following relationship:

$$\text{starting address} = \text{identifier} * \text{size} + \text{base\_offset}$$

where the identifier is an identifier value for a co-processor provided in an identifier register associated with the co-processor, size is a size of a memory region associated with the co-processor, and base_offset is an offset address value for a first memory region.

19. The system of claim 17, wherein the control processor modifies, for each co-processor of the plurality of co-processors, the starting address for the memory region assigned to the co-processor to be an original starting address that is not common among the plurality of co-processors by:
providing the identifier register associated with the co-processor as independent of the memory region associated with the co-processor; and
writing an original identifier value to the identifier register to thereby modify the starting address for the memory region assigned to the co-processor to be the original starting address.

20. A method, in a multiprocessor system, for broadcasting data to a plurality of hardware implemented processors having a shared memory, comprising:
modifying, by a broadcast engine of the multiprocessor system, for each processor of the plurality of processors, a starting address for a memory region, in the shared memory, assigned to the processor, such that each of the plurality of processors has a common starting address in the shared memory;
writing, by the broadcast engine, data to the memory region identified by the common starting address, thereby broadcasting the data to the plurality of processors; and
in response to writing data to the memory region identified by the common starting address, modifying, by the broadcast engine, for each processors, the starting address for the memory region assigned to the processor, such that each processor has a unique starting address in the shared memory.

* * * * *